Jan. 26, 1954   J. E. HESSE   2,667,107
METHOD FOR MANUFACTURE OF FIBER-CEMENT SHEET LAMINATES
Filed Aug. 2, 1950   2 Sheets-Sheet 1
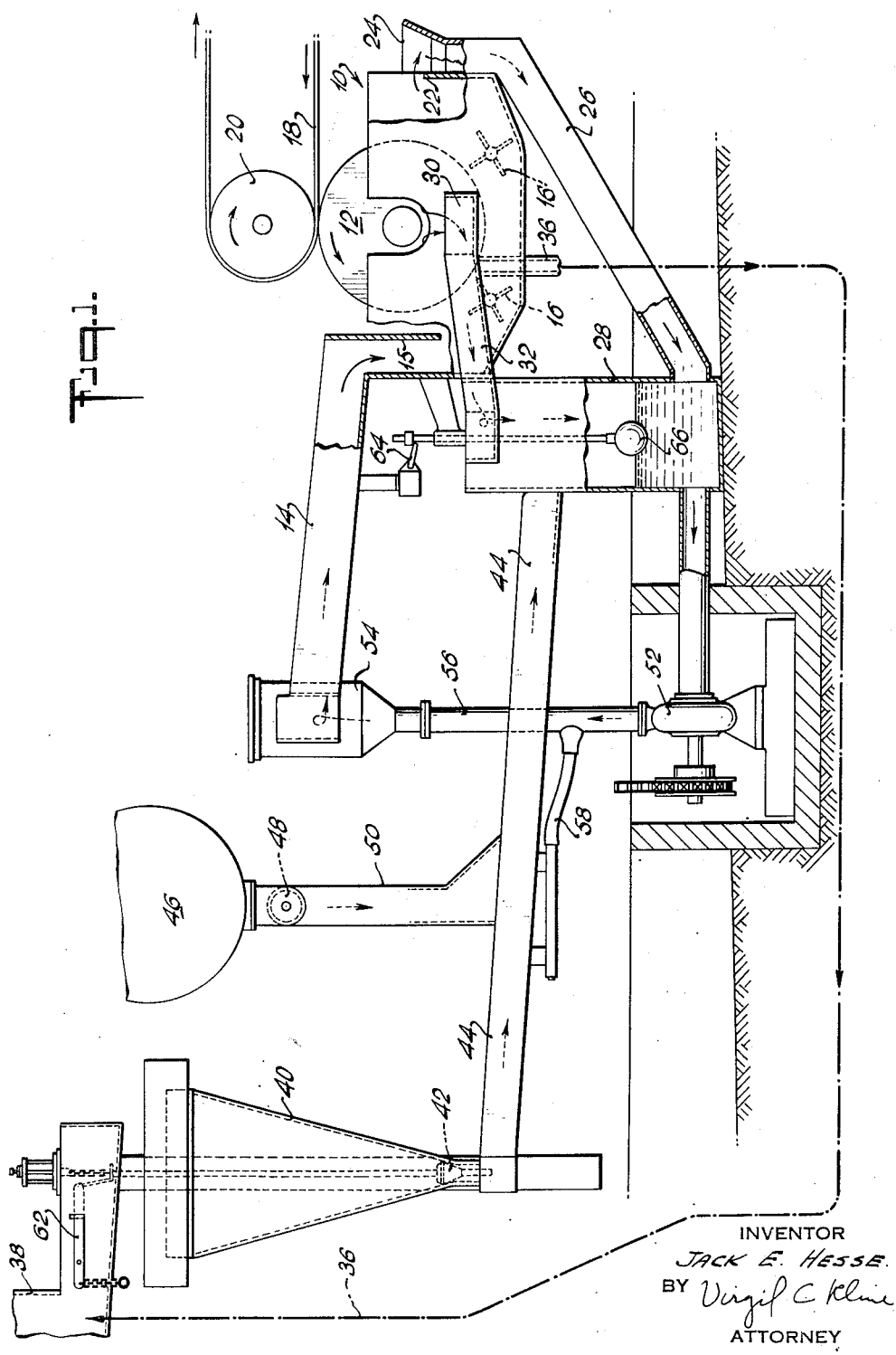
INVENTOR
JACK E. HESSE.
BY Virgil C. Kline
ATTORNEY Jan. 26, 1954   J. E. HESSE   2,667,107
METHOD FOR MANUFACTURE OF FIBER-CEMENT SHEET LAMINATES
Filed Aug. 2, 1950   2 Sheets-Sheet 2
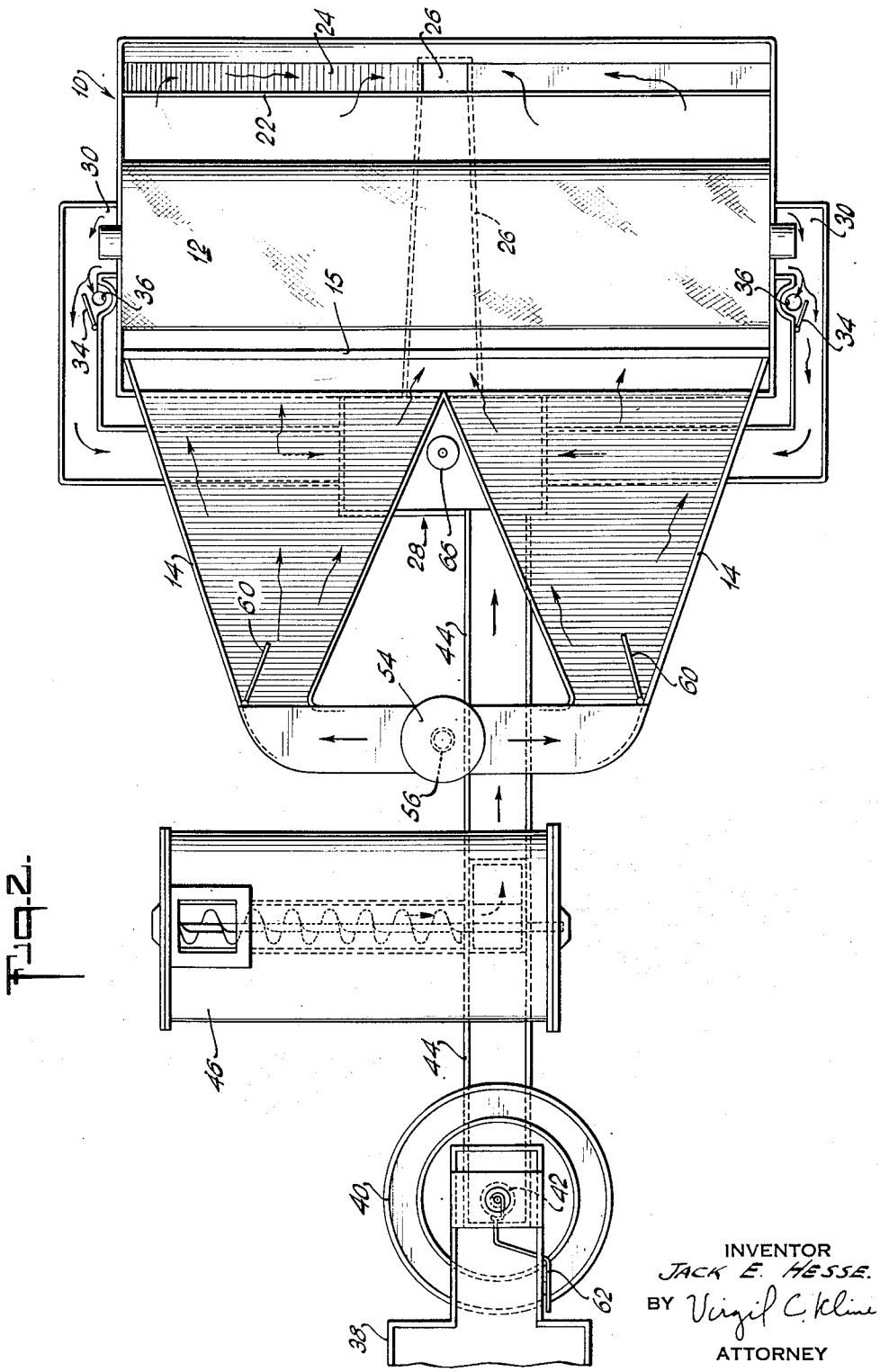
INVENTOR
JACK E. HESSE.
BY Virgil C. Kline
ATTORNEY Patented Jan. 26, 1954

2,667,107

UNITED STATES PATENT OFFICE 2,667,107

METHOD FOR MANUFACTURE OF FIBER-CEMENT SHEET LAMINATES

Jack E. Hesse, Gretna, La., assignor to Johns-Manville Corporation, New York, N. Y., a corporation of New York Application August 2, 1950, Serial No. 177,147

7 Claims. (Cl. 92—38)

This invention relates to the manufacture of fiber-cement sheet laminates, and is particularly directed to improvements in method and apparatus for producing asbestos-cement pipe.

In the conventional method of manufacturing fiber-cement sheet laminates, the initial step is that of forming an aqueous slurry of reinforcing fibers and finely divided hydraulic cement, which slurry is then delivered to a leveling vat or stuff chest provided with agitators. The leveling vat provides a storage source of fibers and cement slurry furnish which is delivered to one or more cylinder mold vats. In each of these mold vats there is rotatably mounted a cylinder mold having a foraminous filter or wire screen facing. As the cylinder mold rotates, water passes through the wire screen facing of the mold into the interior thereof, thereby depositing on the screen a thin web or sheet of felted fibers and cement particles. The thus formed thin sheet or web is continuously transferred from the cylinder mold wire to an endless belt or felt at a zone of contact under a couch roll. The thus transferred wet web or sheet is partially dried by passing over a suction box, after which the felt enters the press section of the machine. In the press section the sheet is transferred to a forming mandrel about which it is continuously wrapped and composited under pressure with previously applied turns of the sheet, to form a tubular laminate of required thickness. If the final product is to be a flat sheet, the tubular laminate built up on the mandrel is cut longitudinally of the mandrel when it has reached the required thickness. For the manufacture of pipe, the tubular laminate is removed from the mandrel as a tube and is thereafter subjected to a hardening cure.

Asbestos-cement pipe thus produced are used extensively for water distribution lines and the like. Such pipe are conventionally made in unit lengths ranging up to 16 feet and with wall thickness of ¼ inch or more for sizes above 3 inches internal diameter. In making pipe of conventional sizes, great difficulty has been encountered in developing uniform wall thickness, strength and density throughout each unit area of the pipe length. The principal reason for this has been a lack of uniformity of strength and thickness in the wet web or sheet initially deposited on the forming mold throughout the length of the mold. It will be appreciated that any non-uniformity of distribution and consistency in the mold vat furnish throughout the length of the forming mold develops greatly magnified non-uniformity as to wall thickness, density and strength in the multiple sheet laminate walls of the resulting pipe built up on the forming mandrel.

An object of the present invention is to provide improvements in method and apparatus for manufacturing fiber-cement sheet laminates.

A particular object is to provide improved method and apparatus for developing and maintaining uniform consistency and felting characteristics throughout each unit portion of the cylinder mold vat.

A further object is to develop maximum density and strength characteristics in the product through adequate control of the degree of relative hydration of the cement component of the molding slurry.

A feature is that of maintaining by circulation a condition of uniform feed to, and uniform high overflow rate from, each unit length of the cylinder mold vat.

With the aforementioned objects and feature in view, the invention consists in the improved method and apparatus for producing fiber-cement sheet laminates which are hereinafter described and more particularly defined by the accompanying claims.

In the following description reference will be made to the accompanying drawings, in which:

Fig. 1 is a diagrammatic side elevation view, with parts broken away, of a preferred embodiment of the apparatus; and Fig. 2 is a top plan view of the cylinder mold vat element of the apparatus.

In the following description the invention will be described as applied to the manufacture of asbestos-cement sheet laminates including pipe. Such products are formed by building up under pressure laminates of freshly formed thin sheets of asbestos-cement composition, said sheets being produced by cylinder mold filtration felting from an aqueous suspension furnish of suitably proportioned mixtures of asbestos fibers and finely divided Portland cement.

Referring to the drawings, there is shown a conventional vat 10 of generally rectangular shape, and a foraminous cylinder mold 12 rotatably mounted within the vat and supported by bearings at each end of the vat. An aqueous furnish or stock suspension of asbestos fibers and Portland cement is continuously supplied to the vat by means of tilted spreader flow pans 14 of such shape and cross-sectional area as to spread the flow of feed stock uniformly over the full length of the vat and cylinder mold. After entering the vat on the flow pan side of a baffle 15 extending the full width of the vat, the stock tends to flow continuously through the vat in a direction concurrent with the counter-clockwise movement of the mold, such flow being promoted by agitators 16 rotatably mounted in the bottom of the vat.

As the stock or furnish flows transversely through the vat around the cylinder mold 12, a portion of the water from the stock passes through the foraminous surface of the mold and thereby deposits a felted web or sheet of fibers and cement particles on the surface of the mold. As the mold continues to rotate, this thin web of felted sheet stock is raised above the level of furnish in the vat, and is continuously transferred from the forming surface or wire of the mold to an endless felt 18 at the zone of contact between this felt and the mold 12, under the couch roll 20. After transference to the felt 18, the wet sheet is handled as in conventional practice such as portrayed in U. S. Patent 2,182,353 of E. W. Rembert et al. Briefly, the wet web is partially dried by removal of water in suction boxes, and the resulting web or sheet is then transferred from the felt 18 to a rotary forming mandrel and is spirally wrapped upon itself upon the mandrel and composited under pressure with previously applied turns of the sheet, to form an asbestos-cement cylinder or tube of predetermined wall thickness.

An important feature of the present improvement consists in delivering aqueous slurry furnish or stock by the feed pans 14 to the forming vat at such a rate as to maintain continuous high rate of overflow over a horizontal weir 22 extending along the full width of that side of the vat 10 which is opposite to the charge feed side of the vat. After passing over the weir 22, this overflow of stock slurry is collected by a trough 24 and returned by pipe 26 to a furnish mixer such as surge tank 28, to be recirculated as hereinafter described. The water which flows through the foraminous forming surface of the cyinder mold into the interior thereof is removed from the mold through ports 30 at each end of the mold, and a portion of this white water is conducted by troughs 32 at each end of the vat into surge tank 28, for recirculation. It will be understood that the ends of the cylinder mold are suitably sealed to prevent inflow of water from the vat into the mold, except through the foraminous forming wire or screen.

Adjustable gate valves 34 are mounted in the troughs 32 at each end of the vat for the purpose of diverting part of the white water through an excess white water draw-off pipe 36, which leads to saveall settling tanks 38. From the bottoms of tanks 38 a concentrated aqueous slurry of excess saveall solids is collected in an accumulator tank 40, from which a measured proportion of the concentrated saveall slurry can be recycled to the forming vat, under the control of an automatic valve 42. As much of the concentrated saveall slurry as is allowed to pass the valve 42 is conducted through a trough 44 to the top of the surge tank 28. Within the surge tank 28 a state of continuous agitation is maintained suitable for thoroughly dispersing the furnish solids in the suspending water. Fresh slurry solids are delivered to the surge tank, along with the recycled white water flowing through chute 44, by continuously feeding such fresh dry asbestos and cement stock into trough 44 from a mixer 46, delivering to a feed trough 48 and pipe 50.

A properly formed furnish of suitable consistency is recycled from surge tank 28 through a centrifugal feed pump 52 and a distributor 54 mounted on the discharge line 56 from the pump. Suitably proportioned volumes of slurry stock furnish are divided by distributor 54 into the feed ends of the pans 14. In order to insure a supply of sufficient water into the trough 44 to transport the fresh feed stock into the surge tank 28, by-pass line pipe 58 is provided connecting the discharge pipe 56 of the circulating pump with the trough 44 at the upstream side of the discharge end of dry stock feed pipe 50.

A manually controlled gate 60 is provided at the upper end of each feed distributor pan 14 as a means of insuring proper distribution flow of feed stock over the full discharge end of each pan 14 into the vat 10. To control the amount of recycled concentrated saveall stock from accumulator 40, the position of valve 42 is regulated by a pneumatic governor 62, which is actuated by an electric circuit under the control of a tipping switch 64 actuated by the arm of a float 66 mounted in the surge tank 28.

The present process follows conventional practice in pipe or sheet manufacture, with respect to the proportions of asbestos and cement and the kinds and grades of asbestos or other fibers employed in the slurry furnish. For pipe manufacture the slurry furnish normally includes a substantial proportion of harsh chrysotile or crocidolite fibers, and the proportion of fiber to Portland cement normally ranges 15–25% fibers and 75–85% Portland cement. The concentration of the slurry furnish also follows conventional practice, such furnish normally comprising 7–12% solids based on the total furnish weight.

In addition to asbestos fibers and Portland cement, preferred practice calls for incorporation in the furnish of finely divided silica in the proportion of about 0.3 to 1.0 part by weight to each part of Portland cement. Sheet or pipe products incorporating silica in their composition are cured in steam at pressures normally ranging between 60–150 lbs./sq. in. Comparable data given herein as to pipe densities and strengths apply to pipes comprising comparable portions of fibers, cement and silica which have been steam cured for test.

The present process follows in general the preferred procedure described in the aforementioned Rembert et al. Patent 2,182,353, with respect to incorporating in the dilute furnish substantial proportions of dry fresh fiber-cement feed stock, for the purpose of insuring that the average period of hydration of the cement component of the furnish will not exceed 5–10 minutes.

The principal feature of novelty of the present process resides in maintaining a rate of overflow of stock from the forming vat pond which lies within the range 25–50% of the rate of supply of feed stock to the vat. By employing this high rate of vat overflow, coupled with a high rate of stock furnish recirculation and low hydration time of the dry feed stock, asbestos pipe made by the present method invariably exhibit marked improvement with respect to uniformity of wall thickness and consequent uniformity of density and strength, and such uniformity is gained without any drop in average strength and density in comparison with pipe made by conventional practice.

The rate of overflow of slurry stock from the cylinder mold vat is maintained at a volume ratio of 50-100% of the rate of white water filtrate separation by the cylinder mold. Only part of the thus separated white water filtrate is recycled directly to the feed side of the vat pond for making up fresh stock, while the other portion of the white water filtrate is concentrated to recover saveall solids for admixture with fresh feed stock. Satisfactory operation within one cylinder mold vat has been obtained when operating the vat on slurry ranging from 7-12% solids concentration, with a fresh stock feed volume of 500 gallons per minute, a vat overflow volume of 200 gallons per minute, and a separation of white water filtrate amounting to approximately 270 gallons per minute. With rapid direct recirculation of the overflow and most of the white water filtrate, adding dry feed stock at the rate of about 100 lbs. per minute, pipes were produced of substantially uniform wall thickness throughout each unit area of the wall and with substantially uniform optimum density and strength characteristics. Despite the high volume rate of direct recirculation to the mold vat, the average hydration period for the cement component of the molding slurry was less than five minutes.

It will be understood that the details given are for the purpose of illustration, not restriction, and that variations within the spirit of the invention are intended to be included in the scope of the appended claims.

What I claim is:

1. In the method for manufacturing felted fiber-cement sheet laminates including the step of continuously forming a thin felt by rotating foraminous cylinder mold filtration from a dilute aqueous suspension pond containing fibers and Portland cement, with separation of white water filtrate, the improvement which comprises, maintaining uniform distribution and consistency of stock by continuously feeding fresh stock to one side of the pond uniformly along the full length of the mold at a rate to develop and maintain continuous overflow in volume ranging between 25% and 50% of the feed volume from the opposite side of the pond along the full length of the mold, continuously admixing fresh dry stock with pond overflow and white water filtrate, and directly recycling such fresh stock suspension.

2. In the method for manufacturing felted fiber-cement sheet laminates including the steps of continuously forming a thin felt by rotating foraminous cylinder mold filtration from a dilute aqueous suspension pond containing fibers and Portland cement, with separation of white water filtrate, the improvement which comprises, maintaining uniform distribution and consistency of stock by continuously feeding fresh stock to one side of the pond uniformly along the full length of the mold at a rate to develop and maintain high volume overflow from the opposite side of the pond along the full length of the mold, continuously admixing fresh dry stock with recycled pond overflow and white water filtrate, maintaining the volume ratio of pond overflow to white water filtrate within the range 50-100%, and maintaining the volume rate of recycling high enough to limit the average period of hydration of the cement to a maximum of ten minutes.

3. In a method for manufacturing felted fiber-cement sheet laminates as defined in claim 1, the additional step of directly recycling only a portion of the white water filtrate while concentrating another portion of said filtrate with recovery of saveall solids which are returned to the pond in admixture with fresh feed stock.

4. In the manufacture of asbestos-cement pipe by laminating a thin asbestos-cement sheet on a forming mandrel after continuously forming said sheet by rotating foraminous cylinder mold filtration from a dilute aqueous slurry pond containing asbestos fibers and Portland cement, with separation of white water filtrate, the improvement which comprises, maintaining uniform distribution and consistency of stock within the pond by continuously feeding fresh stock to one side of the pond uniformly along the full length of the mold at a rate to develop and maintain high volume overflow from the opposite side of the pond along the full length of the mold, continuously mixing fresh dry stock with recycled pond overflow and white water filtrate, maintaining the volume ratio of pond overflow to white water filtrate within the range 50-100%, and maintaining the volume rate of recycling high enough to limit the average time of hydration of the cement within approximately five minutes.

5. In the method for manufacturing felted fiber-cement laminates including the step of continuously forming a thin felt by rotating foraminous cylinder mold filtration from a dilute aqueous suspension pond containing fibers and cement, with separation of white water filtrate, the improvement which comprises, maintaining uniform distribution and consistency of stock by continuously feeding fresh stock to one side of the pond at a rate to develop and maintain continuous overflow from the opposite side of the pond, recycling said pond overflow, and maintaining the volume rate of overflow and recycling high enough to limit the average period of hydration of the cement to a maximum of ten minutes.

6. In the method for manufacturing felted fiber-cement laminates including the step of continuously forming a thin felt by rotating foraminous cylinder mold filtration from a dilute aqueous suspension pond containing fibers and cement, with separation of white water filtrate, the improvement which comprises, maintaining uniform distribution and consistency of stock by continuously feeding fresh stock to one side of the pond at a rate to develop and maintain continuous overflow in volume ranging between 25% and 50% of the feed volume from the opposite side of the pond, continuously admixing fresh dry stock with pond overflow and white water filtrate, and maintaining the volume rate of overflow and recycling of the suspension high enough to limit the average period of hydration of the cement to a maximum of ten minutes.

7. In the method for manufacturing felted fiber-cement laminates including the steps of continuously forming a thin felt by rotating foraminous cylinder mold filtration from a dilute aqueous suspension pond containing fibers and cement, with separation of white water filtrate, the improvement which comprises, maintaining uniform distribution and consistency of stock by continuously feeding fresh stock to one side of the pond at a rate to develop and maintain high volume overflow from the opposite side of the pond, continuously admixing fresh dry stock with recycled pond overflow and white water filtrate, maintaining the volume ratio of pond overflow to white water filtrate within the range 50-100%, and maintaining the volume rate of recycling high enough to limit the average period of hydration of the cement to a maximum of ten minutes.

JACK E. HESSE.

References Cited in the file of this patent

UNITED STATES PATENTS

| Number | Name | Date |
|---|---|---|
| 1,869,148 | Holcomb | July 26, 1932 |
| 1,995,802 | Forman | Mar. 26, 1935 |
| 2,005,839 | Edge | June 25, 1935 |
| 2,182,353 | Rembert | Dec. 5, 1939 |
| 2,246,537 | Rembert | June 24, 1941 |
| 2,249,128 | Goldsmith | July 15, 1941 |
| 2,363,786 | Goldsmith | Nov. 28, 1944 |
| 2,465,445 | Goldsmith | Mar. 25, 1949 |
| 2,540,301 | Staege | Feb. 6, 1951 |

FOREIGN PATENTS

| Number | Country | Date |
|---|---|---|
| 464,713 | Great Britain | Apr. 23, 1937 |

OTHER REFERENCES

"Cylinder Machine Formation," Aug. 17, 1939, issue of Technical Association Papers, Series XXI, by Phillip H. Goldsmith. Pages 125–134.